Oct. 23, 1956　　　F. J. RICCIO　　　2,767,420
SPRING CASTER FOR FURNITURE
Filed Feb. 4, 1953

INVENTOR.
Frank J. Riccio
BY
ATTORNEY.

Patented Oct. 23, 1956

2,767,420

SPRING CASTER FOR FURNITURE

Frank J. Riccio, Brooklyn, N. Y.

Application February 4, 1953, Serial No. 335,137

1 Claim. (Cl. 16—24)

This invention relates to new and useful improvements in casters and caster devices.

More particularly, the present invention proposes the construction of an improved caster device which can be readily and easily attached to the leg of a piece of furniture and which will rotatably support the leg until a predetermined load is applied to the piece of furniture.

Another object of the present invention proposes forming the caster device of a hollow tube with a pin extending through the upper part of the tube for furniture attachment of the caster and the lower end of the tube having a restricted end opening to permit a spring-pressed rotatable ball roller partially and rotatably to extend therethrough.

Still further, the present invention proposes constructing the caster device with a spring of predetermined strength for the particular weight piece of furniture and the load thereon with which the device is to be used and a free floating bearing plate between the spring and the ball.

As a further object, the present invention proposes fixing a ball roller retainer ring in one end of a hollow tube with a furniture attachment pin at the other end extending through the tube, the ring rotatably and retractably holding the ball roller in the tube.

The present invention further proposes a novel ball roller locking means for the caster device to lock the ball roller in retracted position when such is desired.

For further comprehension of the invention, and of the objects and advantages thereof, reference will be had to the following description and accompanying drawings, and to the appended claim in which the various novel features of the invention are more particularly set forth.

In the accompanying drawings forming a material part of this disclosure:

Figure 1:
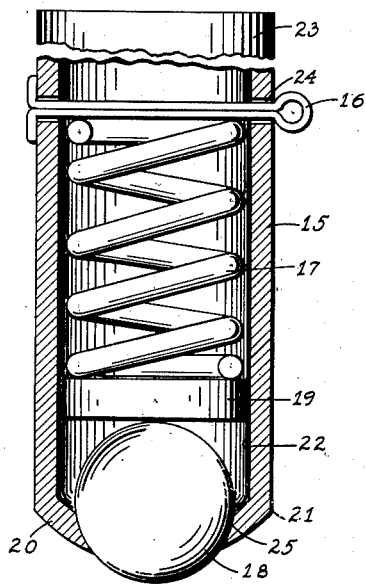
Fig. 1 is a side view partly broken away and in section of the caster device of the present invention.

The caster device, in accordance with the first form of the invention illustrated in Fig. 1 consists of but five easy to make parts: a hollow tube 15, a cotter pin 16, a compressible coil spring 17, a ball roller 18 and a ball roller bearing plate 19.

Hollow tube 15 has an inwardly directed flange 20 at one end 21 (its lower end). The flange 20 provides means to restrict the opening 22 through the tube 15 at this end 21.

Near the upper end 23 of tube 15, a pin opening 24 extends through the tube running across it. Pin 16 removably fits in this pin opening 24 for easy attachment of the tube to the leg of a piece of furniture (not shown).

Ball roller 18 is slidably and rotatably mounted in the tube 15, being freely contained therein and seating against flange 20 at the lower end of the tube. Ball roller 18 is of less diameter than the inside diameter of tube 15 but is of greater diameter than the restricted end opening 25 of the tube through the flange 20 at its lower end 21.

Coil spring 17 is freely mounted and compressible in tube 15 between cotter pin 16 and bearing plate 19 and forms a resilient means in the tube between the ball roller 18 and the pin 16 to bias the ball roller partially and rotatably through the restricted end opening of the tube. Bearing plate 19 is disc-shaped and is slidably contained in the tube 15.

Coil spring 17 is of a strength to bias the bearing plate 19 against ball roller 18 so that the ball roller partially and rotatably extends through the restricted lower end opening 25 of tube 15 until a predetermined load is applied. When such a load is applied, the spring 17 is compressed and ball roller 18 is contracted into the tube 15 so that the flanged lower end of the tube bears against a floor or other base surface.

Figure 2:
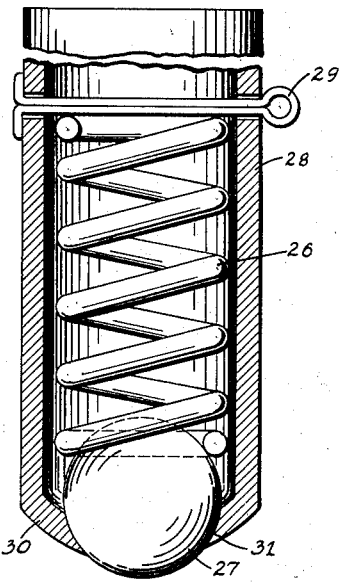
Fig. 2 is a similar view to Fig. 1, but illustrating a modification of the present invention.

The modification of the invention shown in Fig. 2 is characterized by the provision of a coil spring 26 adapted to fit over and seat against ball roller 27 so that the ball roller 27 may rotate even though the spring 26 is bearing against it. The spring 26 is freely contained in hollow tube 28 between a cotter pin 29 and ball roller 27. Ball roller 27 seats against an inwardly directed flange 30 at the lower end of the tube 28. Spring 26 abutting at its upper end either the cotter pin 29 or the leg of a piece of furniture (not shown) and abutting ball roller 27 at its lower end biases the ball roller 27 partially and rotatably out the restricted opening 31 at the lower end of the tube.

Figure 3:
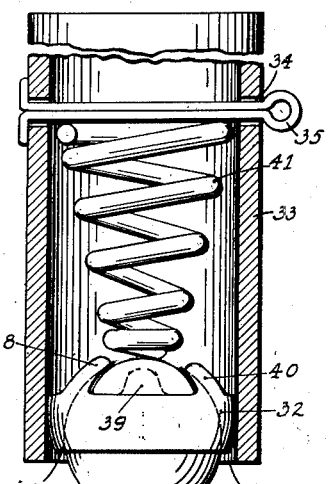
Fig. 3 is a view similar to Figs. 1 and 2, but illustrating another modification of the present invention.

The modification illustrated in Fig. 3 is characterized by the provision of a ball roller retainer ring 32 fixed in hollow tube 33 at its lower end. Tube 33 has a pin opening 34 with a cotter pin 35 extending through it to secure the tube to a piece of furniture.

Ring 32 has one restricted end 36 (the lower end) and a ball roller 37 is freely contained in the ring 32 for rotatable movement and movement up and down in the ring. Ball roller 37 partially and rotatably extends through the restricted end opening 36 in the ring seating itself against the inside of the ring adjacent the lower end thereof.

Peripheral short inwardly directed spaced members or fingers 38, 39 and 40 are provided on the open upper end of the ring 32 to prevent ball roller 37 from passing out of this end of the ring. A compressible conical coil spring 41, disposed in the tube between the cotter pin 35 and the ball roller 37, extends into the ring 32 and abuts and bears against the top of the ball roller 37. The upper end of the coil spring 41 will abut against the leg of a piece of furniture (not shown) when the leg extends into the top of the tube and is secured by cotter pin 35.

Spring 41 biases the ball roller 37 against the lower restricted end 36 of the ring 32. Ring 32 is spaced from the adjacent end edge 42 of the tube 33 to dispose the ball roller 37 entirely within the tube 33 when the resilient member or spring 41 is compressed. The fingers 38, 39 and 40 form top abutment stops for the ball roller 37.

Figure 4:
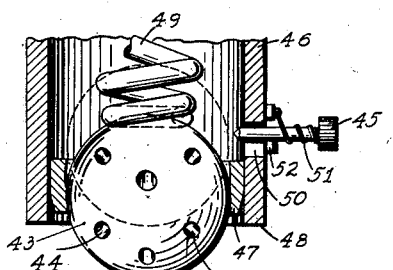
Fig. 4 is a fragmentary sectional view of structure similar to that shown in Fig. 3, but illustrating a further modification of the present invention.
Figures 5, 6:
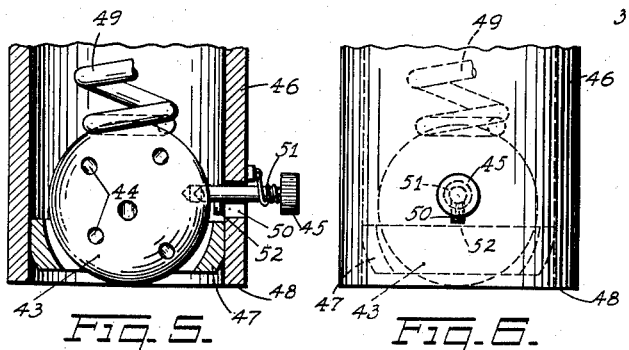
Fig. 5 is a view similar to Fig. 4 showing the ball roller in retracted locked position.
Fig. 6 is a fragmentary side elevational view of the modified form of the invention shown in Fig. 5.

The modification of the present invention illustrated in Figs. 4, 5, and 6 is characterized by the provision of a ball roller 43 having a plurality of spaced radially directed peripheral holes or openings 44 and a retractable locking or slide pin 45 slidably secured to the hollow tube 46 for locking the ball roller in place once it has been retracted in the tube. The ball roller 43 rests in a retainer ring 47 secured to the tube 46 adjacent to but spaced from its lower end 48. Coil spring 49 bears against ball roller 43 and biases the roller against the ring so that it normally partially and rotatably extends out the restricted end opening of the ring.

Tube 46 is provided with a key-shaped opening 50 slidably to receive the locking slide pin 45 and a tension spring 51 is secured to the tube and to the outer end of the slide pin 45 to bias the slide pin toward the tube 46. A locking lug 52 is formed on the slide pin so that when the lug is turned as shown in Fig. 4, the slide pin is held in retracted position, but when the lug is turned as shown in Fig. 5, the tension spring 51 draws the slide pin and lug into the opening 50 so that the inner end of the pin can be seated in one of the holes 44 in the ball roller 43. Thus when the ball roller 43 is retracted and it is desired to lock it in its retracted position, the pin 45 is turned until the tension spring 51 draws the pin 45 into the tube. If a hole 44 in the ball roller 43 is not engaged at once, slight rotation of the ball roller will result in engagement.

It is to be understood that instead of cotter pins a metal bar or any other abutting means may be used in the hollow tubing to retain the spring therein.

While I have illustrated and described the preferred embodiments of my invention, it is to be understood that I do not limit myself to the precise construction herein disclosed and the right is reserved to all changes and modifications coming within the scope of the invention as defined in the appended claim.

Having thus described my invention, what I claim as new, and desire to secure by United States Letters Patent is:

A caster device comprising a hollow tube having opposed transversely disposed openings at one end thereof, a cotter pin removably extending across the tube through said opposed openings for securing the tube to an article of furniture, a ball roller retaining ring fixed in the tube adjacent its other end, a ball roller rotatably and slidably mounted in the ring, spaced fingers on the inner periphery of the ring curved to conform to the curvature of the ball roller for limiting the inward sliding movement of the ball roller, and a conical compressible coil spring interposed between the pin and ball roller with its larger end impinging against the pin and its smaller end abutting against the ball roller between the fingers on the ring so as to bias the ball roller outwardly of the tube and resist inward sliding movement thereof when the article is supporting merely its own weight.

References Cited in the file of this patent

UNITED STATES PATENTS

| | | |
|---|---|---|
| 50,402 | Stoops | Oct. 10, 1865 |
| 440,346 | Dalrymple | Nov. 11, 1890 |
| 488,954 | Smith | Dec. 27, 1892 |
| 740,267 | Gamble | Sept. 29, 1903 |
| 1,102,207 | Belknap | June 30, 1914 |
| 1,284,215 | Baxter | Nov. 12, 1918 |
| 2,176,551 | Solem | Oct. 17, 1939 |

FOREIGN PATENTS

| | | |
|---|---|---|
| 215,183 | Great Britain | May 8, 1924 |
| 806,533 | France | Dec. 18, 1936 |